(12) United States Patent
Tateishi et al.

(10) Patent No.: US 6,368,379 B1
(45) Date of Patent: Apr. 9, 2002

(54) APPARATUS AND METHOD FOR PRODUCING REDUCED METAL

(75) Inventors: Masataka Tateishi; Masahiko Tetsumoto, both of Osaka (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 09/689,630

(22) Filed: Oct. 13, 2000

(30) Foreign Application Priority Data

Oct. 15, 1999 (JP) ............................................ 11-293546

(51) Int. Cl.[7] ............................................... C21B 13/08
(52) U.S. Cl. ......................... 75/484; 266/177; 266/265
(58) Field of Search ........................... 75/484; 266/177, 266/265

(56) References Cited

U.S. PATENT DOCUMENTS

| | | | |
|---|---|---|---|
| 4,923,391 A | * 5/1990 | Gitman | 431/10 |
| 5,989,019 A | 11/1999 | Nishimura et al. | |
| 6,063,156 A | 5/2000 | Negami et al. | |
| 6,129,777 A | 10/2000 | Fuji et al. | |
| 6,149,709 A | 11/2000 | Uragami et al. | |
| 6,152,983 A | 11/2000 | Kamijo et al. | |
| 6,241,803 B1 | 6/2001 | Fuji | |

FOREIGN PATENT DOCUMENTS

| | | |
|---|---|---|
| EP | 0 924 304 | 6/1999 |
| EP | 0 933 434 | 8/1999 |
| EP | 0 976 843 | 2/2000 |
| JP | 11 222617 | 8/1999 |
| TW | 42457 | 9/1981 |
| TW | 356509 | 4/1999 |

* cited by examiner

*Primary Examiner*—Melvyn Andrews
(74) *Attorney, Agent, or Firm*—Oblon, Spivak, McClelland, Maier & Neustadt, P.C.

(57) ABSTRACT

An apparatus for producing a reduced metal includes a moving hearth reducing furnace, a feeding section, a metal discharge section, a gas discharge section, and a regenerative burner. The moving hearth reducing furnace heats a raw material composed of a metal oxide component and a carbonaceous reducing component to form the reduced metal. The feeding section feeds the raw material into the moving hearth reducing furnace. The metal discharge section discharges the reduced metal from the moving hearth reducing furnace. The gas discharge section discharges waste gas from the furnace and is disposed in a reducing process between the moving hearth reducing furnace and the metal discharge section. The regenerative burner functions as a heat source for the moving hearth reducing furnace.

21 Claims, 6 Drawing Sheets

GAS DISTRIBUTION

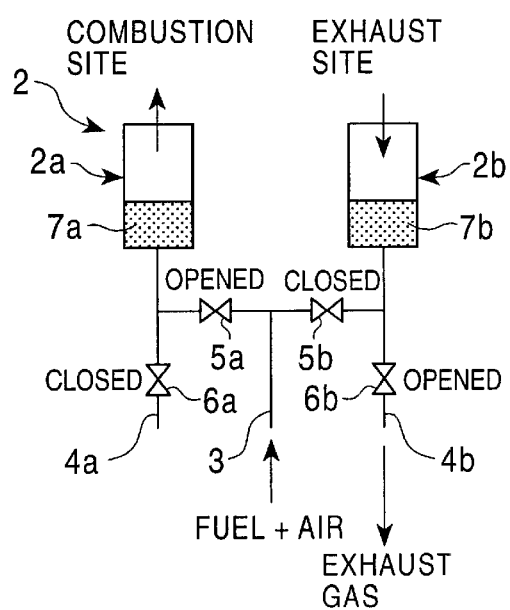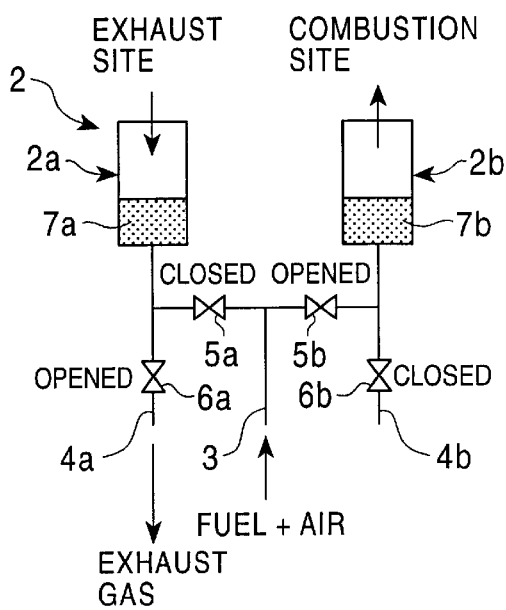

FIG. 10

| TOTAL Fe | SiO2 | Al2O3 | CaO | Na2O | K2O | Zn | Pb | C | Cl | F |
|---|---|---|---|---|---|---|---|---|---|---|
| 59.5 | 2.05 | 0.39 | 3.30 | 0.12 | 0.23 | 0.75 | 0.06 | 13.35 | 0.17 | 0.36 |

(mass %)

FIG. 11

| TOTAL Fe | SiO2 | Al2O3 |
|---|---|---|
| 64.7 | 4.9 | 1.1 |

(mass %)

APPARATUS AND METHOD FOR PRODUCING REDUCED METAL

BACKGROUND OF THE INVENTION

1. Field of the Invention

The present invention relates to an apparatus and a method for producing reduced metal in which an agglomerate incorporated with carbonaceous material (hereinafter merely referred to as agglomerate) composed of an iron oxide or nonferrous metal oxide component and a carbonaceous reducing component is fed into a moving hearth reducing furnace to form reduced iron or metal by thermal reduction.

2. Description of the Related Art

A regenerative burner has two gas supply and exhaust portions. One gas supply and exhaust portion is used as a combustion site to burn fuel in the presence of combustion air, while the other portion is used as an exhaust site which inhales hot gases, e.g., atmospheric gas heated by the burner and combustion gas and exhausts them to the exterior. Each air supply and exhaust portion is provided with a regenerator. Heat of the hot gas inhaled in the exhaust site is accumulated in the regenerator and is used to preheat the fuel and the combustion air which are supplied to the burner at the combustion site. The combustion site and the exhaust site are mutually switched to enhance the thermal efficiency by the use of high-temperature exhaust gas. Thus, regenerative burners have been conventionally used for drying and perheating industrial heating furnaces, such as a metal furnace and a heat treating furnace, and radle refractories.

When hot gas in the furnace contains large amounts of dust components and volatile components, the regenerator is concerned about rapid deterioration and contamination by the volatile components, precluding the use of the regenerative burner.

When the furnace is filled with a reducing atmosphere of combustible gas, the combustible gas inhaled in the exhaust site of the regenerative burner poisons the regenerator. Moreover, combustible gas exhausted from the regenerative burner causes environmental contamination.

A collector is provided between the furnace and the regenerator to collect iron oxide as a dust component. Moreover, some regenerators use materials having high corrosion resistance, such as ceramic. In an alternative method, the interiors of the pipes at the exhaust site and the regenerative burner are replaced with inert gas before the exhaust site is switched to the combustion site in order to prevent combustion of combustible gas.

These technologies, however, additional devices, e.g., the collector and a unit for replacing the gas. As a result, the structure of the regenerative burner is complicated, and the regenerative burner requires a large installation space, resulting in increased initial facility costs. Moreover, switching of the regenerative burner from the exhaust site to the combustion site inevitably requires dust removal and inert gas replacement, requiring switching times.

The use of the material having high corrosion resistance such as ceramic causes increased operational costs, since the expensive regenerator must be frequently replaced to new one due to contamination by the volatile components and dust components. Moreover, scrapping of the used regenerator may cause environmental contamination.

In particular, in a plant in which an agglomerate composed of an iron oxide component and a carbonaceous reducing component is fed into a moving hearth reducing furnace to form reduced iron by heating, iron oxide in the raw material is pulverized and is present as dust in the furnace. Moreover, the raw material may contain large amounts of volatile components in some cases. In the reduction process of reduced iron, the furnace is filled with a reducing atmosphere, which is combustible gas formed from the carbonaceous reducing component or combustible gas blown into the furnace, such as natural gas. Thus, large amounts of volatile components are evaporated in the initial stage of the heating for reduction. Moreover, the plant must be maintained at an adequate reducing atmosphere in order to prevent reoxidation of the reduced iron and to maintain a high metallization rate. Accordingly, the use of the regenerative burner is difficult.

SUMMARY OF THE INVENTION

Accordingly, it is an object of the present invention to provide an apparatus for producing reduced metal using a regenerative burner.

According to an aspect of the present invention, an apparatus for producing a reduced metal includes a moving hearth reducing furnace for heating a raw material comprising a metal oxide component and a carbonaceous reducing component to form the reduced metal, a feeding section for feeding the raw material into the moving hearth reducing furnace, a metal discharge section for discharging the reduced metal from the moving hearth reducing furnace, a gas discharge section for discharging waste gas from the furnace, the gas discharge section being disposed in a reducing process between the moving hearth reducing furnace and the metal discharge section, and a regenerative burner as a heat source for the moving hearth reducing furnace.

Preferably, the regenerative burner is disposed in the first half stage of the reducing process or a region between the feeding section and the gas discharge section of the moving hearth reducing furnace.

Preferably, the regenerative burner is disposed in a region in which the surface temperature of the raw material is 1,250° C. or less, and the gas discharge section is disposed downstream of this region.

Since the regenerative burner is disposed in the first half stage of the reducing process in which volatile components are not significantly volatilized, s regenerator is not deteriorated, and no dust collector is required. Thus, the regenerative burner can be disposed in a small space without increased initial facility costs.

Preferably, the regenerative burner comprises a first regenerative burner for burning a fuel with an oxidizing gas and a second burner for burning a combustible gas in the furnace with an oxidizing gas, the first regenerative burner and the second regenerative burner are disposed in the first half stage of the reducing process, and the second regenerative burner is disposed below the first regenerative burner. Preferably, the regenerative burner burns a combustible gas in the moving hearth reducing furnace with an oxidizing gas, a burner (unregenerative burner) for burning a fuel with an oxidizing gas is disposed in the first half stage of the reducing process, and the regenerative burner is disposed below the burner. In such a configuration, the reducing gas (combustible gas) generated from the interior of the raw material can be effectively burned in the vicinity of the raw material. Thus, the heat transmission effect into the raw material is improved, resulting in promotion of reducing reaction in the raw material.

The raw material may be an agglomerate comprising an iron oxide component and a carbonaceous reducing component. In such a case, the apparatus produces reduced iron. Alternatively, the raw material may be an agglomerate comprising a nonferrous metal oxide component and a carbonaceous reducing component. In such a case, the apparatus produces a reduced nonferrous metal.

The regenerative burner may contain a regenerator comprising one of reduced iron and iron ore agglomerate. These materials are inexpensive, and can be used as a raw material for the apparatus of the present invention after the raw material is contaminated with volatile components and dust. As a result, the waste regenerator can be disposed without increased operational costs and environmental pollution.

Preferably, the regenerative burner is disposed horizontally or slightly upwardly with respect to the hearth of the moving hearth reducing furnace, at the upper portion of the moving hearth reducing furnace in the second half stage of the reducing process or a region between the gas discharge section and the metal discharge section. Preferably, a combustion gas in the regenerative burner in the second half stage is an oxidizing atmosphere, and the raw material is surrounded by a reducing atmosphere. Since the regenerative burner and the vicinity of the agglomerate are maintained at the appropriate atmospheres, substitution using an inert gas is not necessary. Thus, the regenerative burner can be disposed in a small space and can be rapidly switched from the exhaust site to the combustion site. Since the regenerative burner is disposed horizontally or slightly upwardly with respect to the hearth of the moving hearth reducing furnace in the upper portion of the moving hearth reducing furnace, the oxidizing gas does not flow directly toward the surface of the raw material. Thus, the reduced metal is not oxidized by the oxidizing gas, resulting in a high metallization rate.

According to another aspect of the present invention, a method for producing a reduced metal by heating an raw material comprising a metal oxide component and a carbonaceous reducing component, comprises the steps of feeding the raw material into the moving hearth reducing furnace, and heating the raw material by a regenerative burner disposed at the upper portion of the moving hearth reducing furnace while discharging waste gas from the furnace in the first half stage of a reducing process between feeding of the raw material and discharging of reduced iron.

Preferably, the raw material is heated by a regenerative burner which is disposed horizontally or slightly upwardly with respect to the hearth of the moving hearth reducing furnace at a upper portion of the moving hearth reducing furnace in the second half stage of the reducing process, and a combustion gas of the regenerative burner is maintained at an oxidizing atmosphere so that the vicinity of the regenerative burner is maintained at an oxidizing atmosphere and the vicinity of the raw material is maintained at a reducing atmosphere.

Alternatively, the raw material may be heated by a regenerative burner which is disposed in a region in which the surface temperature of the raw material is 1,250° C. or less in the first half stage of the reducing process, and the waste gas in the furnace may be discharged at a position downstream of the region in which the surface temperature of the raw material is 1,250° C. or less.

In the above method, the regenerative burner is disposed in the first half stage of the reducing process in which volatile components are not significantly volatilized. Thus, the regenerative burner is not deteriorated by the volatile components and a dust collector is unnecessary. The regenerative burner can be disposed in a small space without increased initial facility costs. Since the regenerative burner and the vicinity of the raw material are maintained at the appropriate atmospheres, substitution using an inert gas is not necessary. Thus, the regenerative burner can be disposed in a small space and can be rapidly switched from the exhaust site to the combustion site. Since the regenerative burner is disposed horizontally or slightly upwardly with respect to the hearth of the moving hearth reducing furnace in the upper portion of the moving hearth reducing furnace, the oxidizing gas does not flow directly toward the surface of the raw material. Thus, the reduced metal is not oxidized by the oxidizing gas, resulting in a high metallization rate.

Preferably, a first regenerative burner for burning a fuel with an oxidizing gas and a second regenerative burner for burning a combustible gas in the moving hearth reducing furnace with an oxidizing gas are disposed in the first half stage of the reducing process instead of the regenerative burner, and the second regenerative burner is disposed below the first regenerative burner. Preferably, the regenerative burner burns a combustible gas in the moving hearth reducing furnace with an oxidizing gas, a burner (unregenerative burner) for burning a fuel with an oxidizing gas is disposed in the first half stage of the reducing process, and the regenerative burner is disposed below the burner. In such a configuration, the reducing gas (combustible gas) generated from the interior of the raw material can be effectively burned in the vicinity of the raw material. Thus, the heat transmission effect into the raw material is improved, resulting in promotion of reducing reaction.

Preferably, the regenerative burner contains a regenerator comprising one of reduced iron and iron ore agglomerate. These materials are inexpensive, and can be used as a raw material for the apparatus of the present invention after the raw material is contaminated with volatile components and dust. As a result, the waste regenerator can be disposed without increased operational costs and environmental pollution. The metal oxide component of the agglomerate may be an iron oxide component for producing reduced iron. Alternatively, a part or the entity of the metal oxide component may be a nonferrous metal oxide for producing a reduced nonferrous metal.

BRIEF DESCRIPTION OF THE DRAWINGS

FIG. 7A is a schematic view of a regenerative burner when one gas supply and exhaust portion is a combustion site and the other gas supply and exhaust portion is an exhaust site; FIG. 7B is a schematic view of a regenerative burner when one gas supply and exhaust portion is an exhaust site and the other gas supply and exhaust portion is a combustion site;

FIG. 10 is a table showing the composition of an agglomerate; and

FIG. 11 is a table showing the composition of iron ore agglomerate used as a regenerator.

DESCRIPTION OF THE PREFERRED EMBODIMENTS

Figure 1:
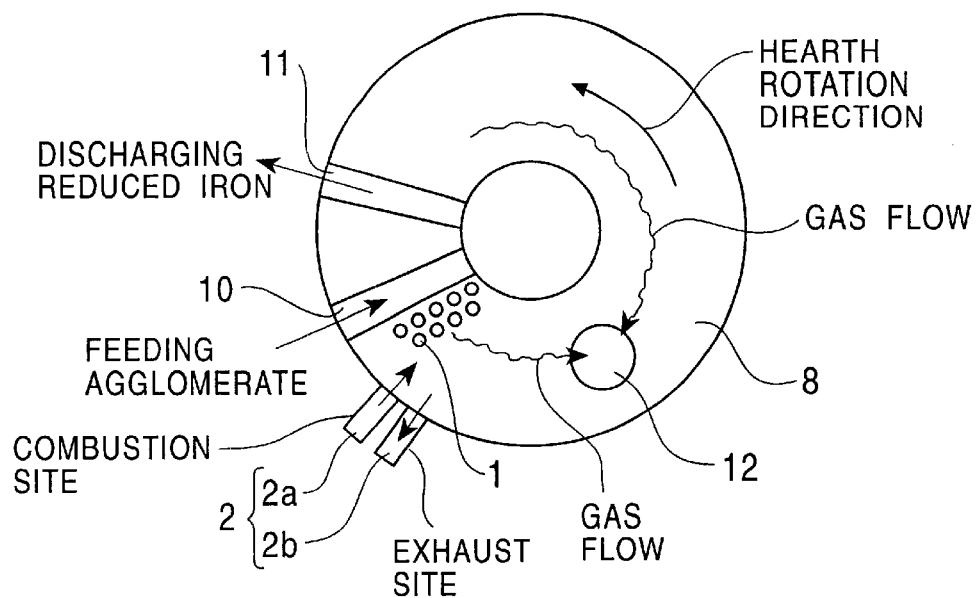
FIG. 1 is a conceptual view of an apparatus for producing reduced iron in which a regenerative burner of the present invention is disposed in the first half stage of a reducing process.

The preferred embodiments of the present invention will be described according to an apparatus for producing reduced iron with reference to FIGS. 1 to 11. In the apparatus for producing reduced iron, a regenerative burner 2 shown in FIGS. 7A and B is used. The regenerative burner 2 has two gas supply and exhaust portions 2a and 2b. With reference to FIG. 7A, one gas supply and exhaust portion 2a is used as a combustion site in which fuel and combustion air flow in a fuel pipe 3, a valve 5a, and a regenerator 7a, to burn the fuel in the combustion site. The other gas supply and exhaust portion 2b inhales hot gas, such as an atmospheric gas heated in the combustion site 2a and combustible gas, and exhausts the hot gas via a regenerator 7b, a valve 6b, and an exhaust pipe 4b. In this process, the sensible heat of the hot gas is accumulated in the regenerator 7b, and a valve 5b and a valve 6a are closed. After a predetermined elapsed time, valves are switched to a state shown in FIG. 7B. The gas supply and exhaust portion 2b is used as a combustion site in which the fuel and combustion air are fed thorough the fuel pipe 3, the valve 5b, and the regenerator 7b to burn the fuel. The gas supply and exhaust portion 2a inhales the hot gases, such as the atmospheric gas and the combustion gas, and exhaust the hot gases to the exterior through the regenerator 7a, the valve 6a, and an exhaust pipe 4a. The fuel and the combustion air are heated by the heat accumulated in the regenerator 7b, while the sensible heat of the hot gas is accumulated in the regenerator 7b. In this state, the valve 5a and the valve 6b are closed. After a predetermined time elapses, the system is switched again to the state shown in FIG. 7A. These two states are repeated to enhance thermal efficiency using the sensible heat of the hot gas.

FIG. 1 shows a first embodiment of an apparatus for producing reduced iron in accordance with the present invention using this regenerative burner. In this embodiment, a rotary hearth furnace is used as a moving hearth furnace. An iron oxide component and a carbonaceous reducing component are preliminarily mixed. The mixture may contain a binder, if necessary. The mixture is shaped into pellet or briquette agglomerate (raw material) 1 incorporated with carbonaceous material, if necessary. The agglomerate (raw material) 1 is fed onto a rotary hearth 8 in the furnace through an agglomerate feeder 10, and is leveled by a leveler (not shown in the drawing), if necessary. In a reducing process in which the agglomerate 1 on the hearth 8 moves from the agglomerate feeder 10 to an iron discharge section 11, the iron oxide in the agglomerate 1 is reduced to iron.

The interior of the furnace is heated to 1,350° C. to 1,400° C. by gas from the combustion site of the supply and exhaust portions 2a and 2b of the regenerative burner 2 which is installed between the agglomerate feeder 10 and the iron discharge section 11. The iron oxide is reduced by the heat while the rotary hearth rotates one turn so that a predetermined metallization rate is achieved. The reduced iron is discharged from the iron discharge section 11.

The exhaust gas in the furnace is discharged from a gas discharge section 12 and from the exhaust site of the supply and exhaust portions 2a and 2b of the regenerative burner 2.

As described above, the gas supply and exhaust portions 2a and 2b are alternately used as the combustion site and the exhaust site to repeat combustion and exhaust ventilation (heat accumulation). Since the heat in the regenerator preliminarily heats the fuel and the combustion air from a burner, thermal efficiency is improved.

Figure 3:
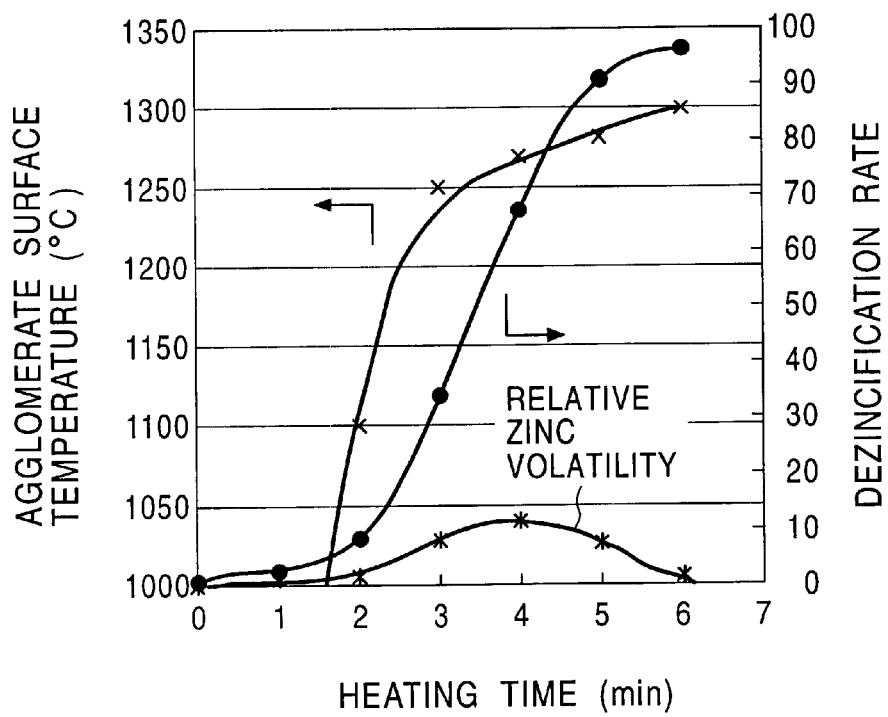
FIG. 3 is a graph showing the surface temperature of agglomerate, the dezincification rate, and the relative zinc volatility when the agglomerate is heated.

The agglomerate 1 fed from the feeder is rapidly heated by the hot gas in the furnace. The volatile components contained in the agglomerate 1 are volatilized. As shown in FIG. 3, zinc, which is a typical volatile component contained in the agglomerate 1, starts to be steeply volatilized when the surface temperature of the agglomerate 1 exceeds 1,250° C. When the gas containing this volatile component is discharged from the exhaust site of the regenerative burner 2, the volatile component is accumulated in the regenerator. The clogging by the volatile component results in decreased heat accumulating efficiency of the regenerator. Thus, the regenerative burner 2 is preferably placed in a region in which large amounts of volatile components are not volatilized and the surface temperature of the agglomerate 1 is 1,250° C. or less in the first half stage of the reducing process.

Preferably, the gas discharge section 12 is disposed downstream of the above region in which the surface temperature of the agglomerate 1 is 1,250° C. or less. In the first half stage of the reducing process, the volatile components are not volatilized and thus the gas exhausted from the regenerative burner 2 does not contain the volatile components. The volatile components in the agglomerate 1 are volatilized in a region in which the surface temperature is higher than 1,250° C. and are removed through the gas discharge section 12. As a result, the regenerator of the regenerative burner 2 does not clog and is not damaged with the volatile components. Also, dust in the furnace is not exhausted through the regenerative burner 2. Accordingly, the regenerative burner 2 is protected from decreased regenerating efficiency due to deterioration and clogging thereof.

Figure 2:
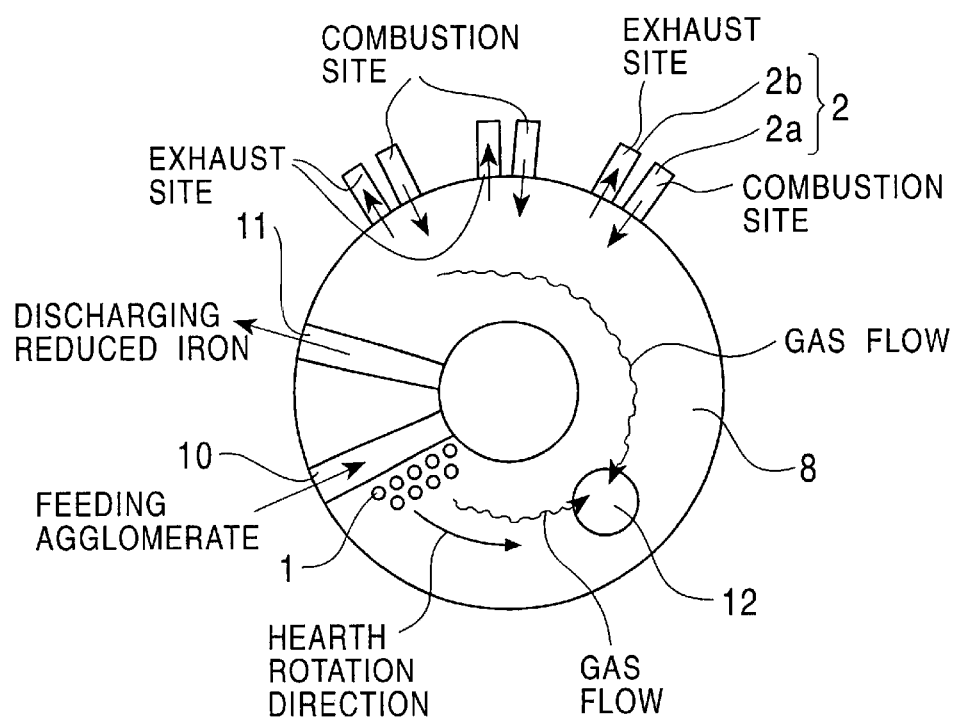
FIG. 2 is a conceptual view of an apparatus for producing reduced iron in which a regenerative burner of the present invention is disposed in the second half stage of a reducing process.
Figure 5A:
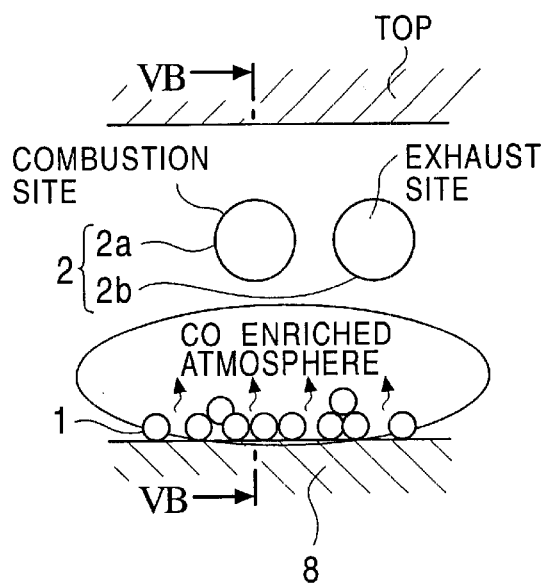
FIG. 5A is a schematic view showing the relationship between agglomerate and a regenerative burner.
Figure 5B:
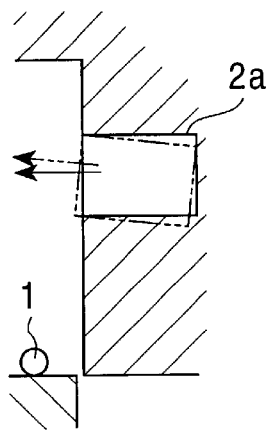
FIG. 5B is a cross-sectional view taken from line VB—VB in FIG. 5A.

FIG. 2 shows a second embodiment of the rotary hearth furnace in accordance with the present invention. In this embodiment, the regenerative burner 2 is disposed in the second half stage of the reducing process. In the reducing process, the agglomerate 1 generates CO-enriched combustible gas therefrom. The gas reduces iron oxide in the interior of the agglomerate 1 to form $CO_2$. The excess of CO gas is evolved to the surface of the agglomerate 1 to prevent reoxidation of reduced iron. In the second half stage of the reducing process, the amount of CO gas evolved to the surface of the agglomerate 1 is decreased due to the final stage of the reduction. When the combustion site 2a of the regenerative burner 2 is disposed downwardly at the upper portion of the furnace to maintain the temperature of the agglomerate 1 and the furnace, the vicinity of the agglomerate 1 immediately becomes an oxidizing atmosphere and the reduced iron is readily reoxidized. Moreover, the reducing gas may be discharged to the exhaust site 2b of the regenerative burner 2. As shown in FIG. 5B, the regenerative burner 2 is disposed horizontally or slightly upwardly with respect to the hearth in the present invention. Since the combustion gas from the combustion site 2a of the regenerative burner 2 does not disturb the atmosphere in the vicinity of the agglomerate 1 and does not cause reoxidation of the reduced iron, maintaining a high metallization rate and preventing discharge of combustible reducing gas form the exhaust site 2b of the regenerative burner 2.

Figure 6A:
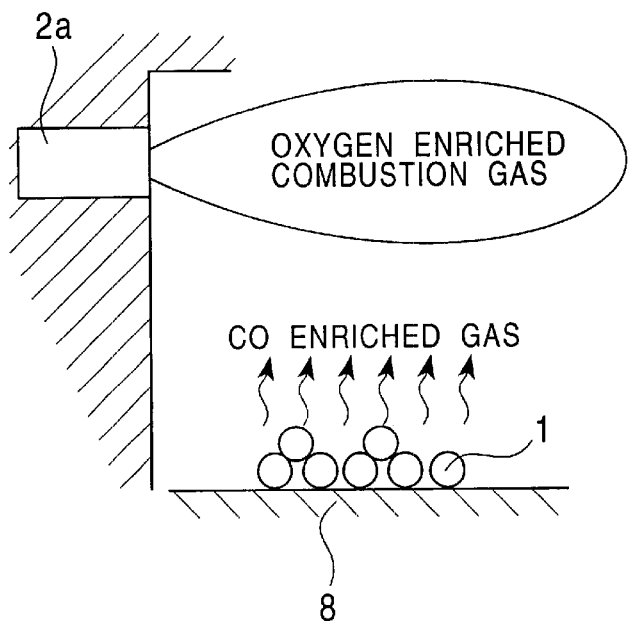
FIG. 6A is a schematic view showing atmospheres in the vicinity of a regenerative burner and agglomerate.
Figure 6B:
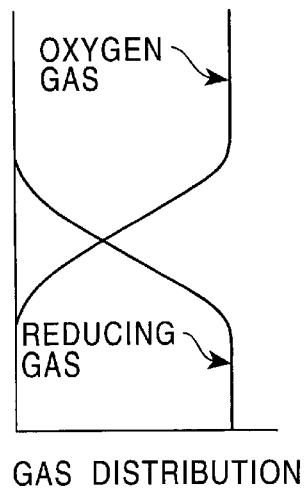
FIG. 6B is a graph showing the distributions of an oxidizing gas and a reducing gas in FIG. 6A.

As shown in FIG. 6A, the combustion gas in the combustion site 2a of the regenerative burner 2 is an oxidizing atmosphere enriched with oxygen in order to burn the combustible reducing gas generated in the reducing process. As a result, as shown in FIG. 5B, the vicinity of the agglomerate 1 is filled with the reducing atmosphere, whereas the vicinity of the regenerative burner 2 is filled with the oxidizing atmosphere. Accordingly, reoxidation of reduced iron and evacuation of the combustible reducing gas from the exhaust site 2b of the regenerative burner 2 are prevented. Moreover, the reducing gas is effectively used in the furnace, maintaining the furnace temperature and reducing energy costs.

Instead of the oxygen-enriched oxidizing atmosphere in the regenerative burner 2, air or oxygen may be blown into the furnace above the agglomerate 1 and below the regenerative burner 2. In this case, the air or oxygen is preferably blown horizontally or slightly upwardly with respect to the hearth. The combustible reducing gas generated in the reducing process can be stably and effectively burned without forming an oxidizing atmosphere excessively enriched by oxygen from the combustion gas in the regenerative burner 2. Since the oxidizing gas is not blown directly onto the surface of the agglomerate 1, the reduced iron is protected from reoxidation and a high metallization rate is maintained.

When the carbonaceous components which are adequate for maintaining the reducing atmosphere in the second half stage of the reducing process are not included in the agglomerate 1, hydrocarbon ($C_nH_n$) gas may be blown onto the agglomerate 1 to prevent reoxidation of the reduced iron. Also, in this case, the combustion gas in the regenerative burner 2 is maintained at an oxygen-enriched oxidizing atmosphere or air or oxygen is blown to burn the reducing gas and the hydrocarbon gas.

As shown in FIG. 12, the gas discharge section 12 for discharging the gas in the furnace is preferably disposed upstream of the second half stage of the reducing process. For example, when the gas discharge section 12 is disposed in the second half stage of the reducing process provided with the regenerative burner 2, the combustible gas in the vicinity of the agglomerate 1, as well as the combustion gas from the regenerative burner 2, may be discharged from the gas discharge section 12. As a result of such a gas flow, the combustible gas may be discharged from the exhaust site 2b of the regenerative burner 2 and the reduced iron may be reoxidized. By arranging the gas discharge section 12 in the second half stage of the reducing process, the combustible gas in the vicinity of the agglomerate 1 flows towards the gas discharge section 12. Thus, the combustible gas is adequately burned before it is discharged from the gas discharge section 12. The regenerative burner 2 is not disposed in the vicinity of the gas discharge section 12, the combustible gas is not discharged from the exhaust site 2b of the regenerative burner 2 and reoxidation of the reduced iron is prevented.

The volatile components such as zinc are substantially volatilized from the agglomerate 1 in the second half stage of the reducing process and are discharged from the gas discharge section 12.

Figure 8:
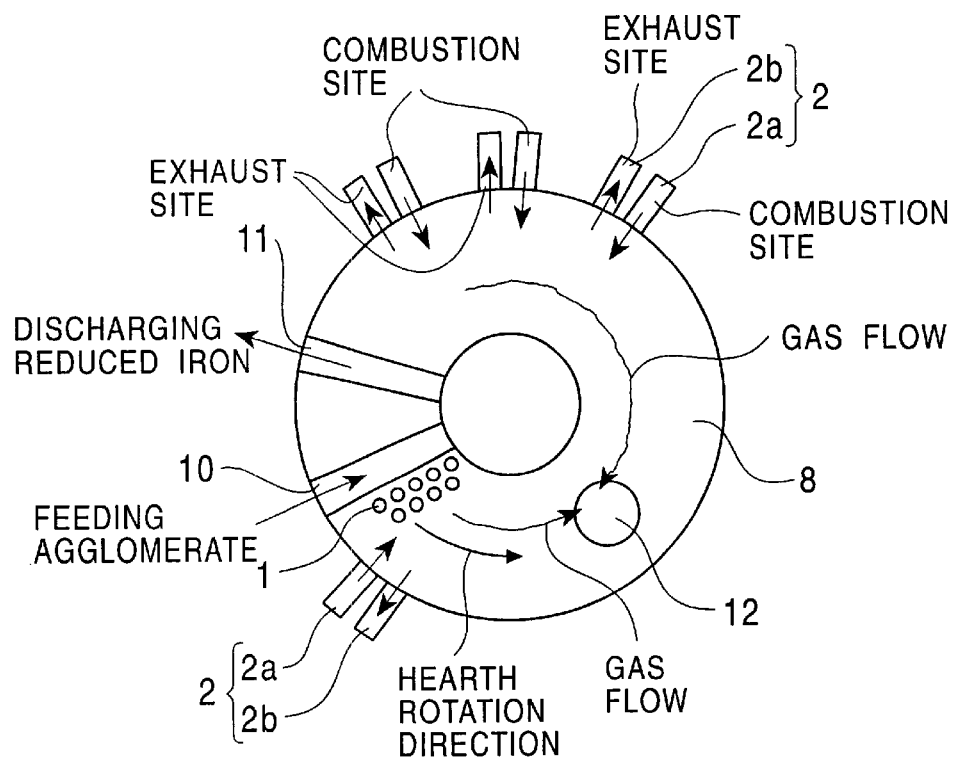
FIG. 8 is a conceptual view of an apparatus for producing reduced iron in which regenerative burners of the present invention are disposed in both the first half stage and the second half stage of a reducing process.
Figure 9:
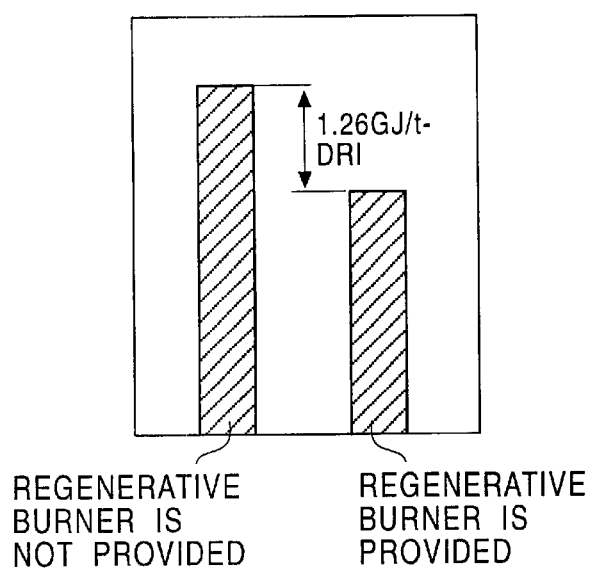
FIG. 9 is a graph showing a difference in fuel unit consumption between when a regenerative burner is provided and when the regenerative burner is not provided.

In FIGS. 1, 2, and 8, the number of the regenerative burners 2 used in the present invention is one for the first half stage of the reducing process and three for the second half stage. The number of the regenerative burner 2 in the present invention, however, depends on the scale of production of reduced iron and the thermal output of the regenerative burner 2 and may be appropriately determined based on the designing conditions. In FIG. 1, the regenerative burner 2 is disposed in the first half stage of the reducing process, and in FIG. 2, the regenerative burners 2 are disposed in the second half stage of the reducing process. As shown in FIG. 8, however, a plurality of regenerative burners 2 may be disposed in the first and second half stages in the reducing process. In the cases shown in FIGS. 1 and 2, other types of burners are preferably disposed in the second stage and the first stage, respectively, of the reducing process, although not shown in the drawing. When the regenerative burners 2 are disposed in the both first and second stages as shown in FIG. 8, other types of burner are also disposed if the furnace temperature is not maintained only by the regenerative burners 2.

When a plurality of regenerative burners are used, a first regenerative burner is disposed for burning the fuel with the oxidizing gas and a second regenerative burner is disposed for burning the combustible gas with the oxidizing gas below the first regenerative burner (between the first regenerative burner 2 and the hearth). That is, a plurality of regenerative burners may be vertically disposed. In such an arrangement, the reducing gas (combustible gas) generated in the interior of the agglomerate can be effectively burned in the vicinity of the agglomerate. Thus, the heat transmission efficiency into the interior of the agglomerate is improved. Since reduction of the iron oxide in the agglomerate is promoted, this arrangement is effective for the second half stage of the reducing process which requires rapid heating. In contrast, when a burner is placed at lower side in the second half stage of the reducing process, the reduced iron may be reoxidized. Thus, a second regenerative burner is preferably disposed at a height as the same as or higher the height of the first regenerative burner in the first half stage. Moreover, another type of burner, for example, a gas burner, an oil burner, or a pulverized coal burner may be used instead of the first regenerative burner. It is preferable that the first regenerative burner be disposed above the second regenerative burner, but the arrangement may be inverted without problems in production.

Figure 4:
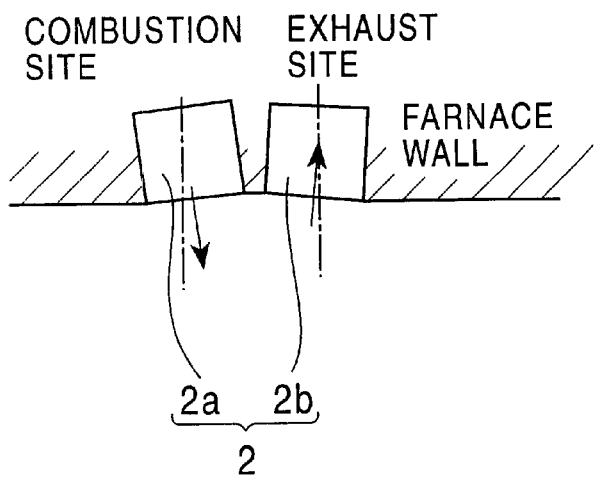
FIG. 4 is a schematic view of an arrangement of a regenerative burner.

Both the combustion site and the exhaust site of the regenerative burner 2 are disposed in a horizontal direction perpendicular to the moving direction of the rotary hearth. As shown in FIG. 4, the combustion site and the exhaust site may be mutually tilted to each other.

The regenerative burner may be of a type in which only an oxidizing gas, such as air, oxygen, or oxygen-enriched air, is blown into the furnace to burn the combustible gas generated from the agglomerate and the combustible gas blown into the furnace for preventing reoxidation of the reduced iron, in addition to a type in which fuel is burned in the presence of oxidizing gas, such as air, oxygen, or oxygen-enriched air, in the regenerative burner and the combustion gas is blown into the furnace.

A third embodiment of the present invention will be described. In this embodiment, agglomerated iron ore or reduced iron is used as the regenerator of the regenerative burner 2. Since the agglomerated iron ore and the reduced iron do not contain any carbonaceous material and any volatile component, no reducing gas and no volatile component are generated when these are heated by hot gas. Thus, these materials can be used without problems. Moreover, the agglomerated iron ore and the reduced iron are inexpensive compared to general regenerator materials, such as ceramic. The iron ore agglomerate used as the regenerator can be used as an iron source in the apparatus for producing reduced iron in accordance with the present invention and in blast furnaces. When the volatile components are accumulated in the iron ore agglomerate, the volatile components can be effectively removed by using the agglomerate as a raw material for the apparatus in accordance with the present invention, and the regenerator can be replaced with new one at reduced cost.

Moreover, the regenerator may be oxide of the reduced iron or iron ore agglomerate which are sintered for the use in ironworks. These materials are inexpensive and readily available. Moreover, these materials have stable shapes and properties due to oxidation or sintering and can be easily handled.

The metal oxide material used in the present invention may be iron ore, iron oxide concentrate, and scraps, such as dust, sludge, and scales, containing iron and metal oxides, which are generated in electric furnaces and ironworks. The carbonaceous reducing component may be coal, cokes, char, and oil cokes.

The above embodiments have been described with reference to the iron oxide component. A part or the entity of the iron oxide may be replaced with a nonferrous oxide, such as manganese oxide, nickel oxide, or chromium oxide. The nonferrous oxide can also be reduced using the regenerative burner without problems.

The present invention will now be described in more detail with reference to the embodiment shown in FIG. 8. FIG. 10 shows the composition of the agglomerate incorporated with a carbonaceous material used in this embodiment. FIG. 3 shows the surface temperature of the agglomerate having the composition shown in FIG. 10 when the agglomerate is heated, the dezincification rate of zinc which is a typical volatile component, and the relative zinc volatility. The dezincification rate represents the percentage of the volatilized zinc to the total zinc content in the raw material. The relative zinc volatility represents the amount of volatilized zinc at any heating time to the amount of volatilized zinc at a heating time of one minute.

Zinc which is a typical volatile component is present as zinc oxide in the raw material and the zinc oxide is reduced and volatilized by the following thermal reaction: $ZnO + CO \rightarrow Zn + CO_2$. The volatilized zinc is accumulated in the regenerator etc. As shown in FIG. 3, zinc is rapidly volatilized at a temperature of approximately 1,200 to 1,250° C. or more. In the present invention, the regenerative burner is disposed at a position in which the surface temperature of the agglomerate is less than 1,250° C. to prevent accumulation of the volatile component in the regenerator. The gas discharge section 12 is disposed downstream of the stage at 1,250° C. or less so as to discharge the volatile components including zinc generated from the agglomerate 1.

In the second half stage of the reducing process, almost of the zinc in the agglomerate has been already volatilized. Thus, zinc is not substantially volatilized in the second half stage although the temperature of the agglomerate is high. Since the gas discharge section 12 is disposed in the first half stage of the reducing process including the regenerative burner, the volatile components generated in the first half stage of the reducing process can be discharged to the exterior without diffusion into the second half stage.

As shown in FIG. 10, providing the regenerative burner can reduce the fuel unit consumption by approximately 1.26 GJ/tDR1 (1.260 J or 0.3 Gcal per 1 ton reduced iron). The fuel unit consumption depends on the production scale. In this embodiment, a rotary furnace having an outer diameter of 21.5 m and an inner diameter of 14.0 m was operated at a production rate of reduced iron of 20 t/h.

FIG. 11 shows an example composition of iron ore agglomerate used as a regenerator. Iron ore agglomerate having diameters of 5 to 15 mm were screened and agglomerate having diameters of 6 to 9 mm were used as the regenerator. The iron ore agglomerate have similar properties to the properties of alumina material, which is conventionally used and can be used without problems. Moreover, the agglomerate used were reused as an iron source in the reducing furnace of the present invention without problems. Since, 90% to 95% of the iron ore agglomerate is composed of $Fe_2O_3$ and $Fe_3O_4$, the agglomerate do not substantially form $SiO_2$—$FeO$—$Al_2O_3$-based low-melting-point compounds. Thus, the agglomerate can be used as the regenerator without melting of the surface thereof and deterioration of gas permeability.

What is claimed is:

1. An apparatus for producing a reduced metal comprising:
   a moving hearth reducing furnace for heating a raw material comprising a metal oxide component and a carbonaceous reducing component to form the reduced metal;
   a feeding section for feeding the raw material into the moving hearth reducing furnace;
   a metal discharge section for discharging the reduced metal from the moving hearth reducing furnace;
   a gas discharge section for discharging waste gas from the furnace, the gas discharge section being disposed in a reducing process between the moving hearth reducing furnace and the metal discharge section; and
   a regenerative burner as a heat source for the moving hearth reducing furnace.

2. An apparatus for producing reduced metal according to claim 1, wherein the regenerative burner is disposed in the first half stage of the reducing process or a region between the feeding section and the gas discharge section of the moving hearth reducing furnace.

3. An apparatus for producing reduced metal according to claim 2, wherein the regenerative burner is disposed in a region in which the surface temperature of the raw material is 1,250° C. or less, and the gas discharge section is disposed downstream of this region.

4. An apparatus for producing reduced metal according to claim 1, wherein the regenerative burner comprises a first regenerative burner for burning a fuel with an oxidizing gas and a second burner for burning a combustible gas in the furnace with an oxidizing gas, the first regenerative burner and the second regenerative burner are disposed in the first half stage of the reducing process, and the second regenerative burner is disposed below the first regenerative burner.

5. An apparatus for producing reduced metal according to claim 1, wherein the regenerative burner burns a combustible gas in the moving hearth reducing furnace with an oxidizing gas, a burner for burning a fuel with an oxidizing gas is disposed in the first half stage of the reducing process, and the regenerative burner is disposed below the burner.

6. An apparatus for producing reduced metal according to claim 1, wherein the raw material is an agglomerate comprising an iron oxide component and a carbonaceous reducing component.

7. An apparatus for producing reduced metal according to claim 1, wherein the raw material is an agglomerate comprising a nonferrous metal oxide component and a carbonaceous reducing component.

8. An apparatus for producing reduced metal according to claim 1, wherein the regenerative burner contains a regenerator comprising one of reduced iron and iron ore agglomerate.

9. An apparatus for producing reduced metal according to claim 1, wherein the regenerative burner is disposed horizontally or slightly upwardly with respect to the hearth of the moving hearth reducing furnace, at the upper portion of the moving hearth reducing furnace in the second half stage of the reducing process or a region between the gas discharge section and the metal discharge section.

10. An apparat us for producing reduced metal according to claim 9, wherein a combustion gas in the regenerative burner in the second half stage is an oxidizing atmosphere, and the raw material is surrounded by a reducing atmosphere.

11. An apparatus for producing a reduced metal comprising:
    a moving hearth reducing furnace for heating a raw material comprising an iron oxide component and a carbonaceous reducing component to form the reduced metal;
    a feeding section for feeding the raw material into the moving hearth reducing furnace;
    a metal discharge section for discharging the reduced metal from the moving hearth reducing furnace;
    a gas discharge section for discharging waste gas from the furnace, the gas discharge section being disposed in a reducing process between the moving hearth reducing furnace and the metal discharge section and downstream of a region in which the surface temperature of the raw material is 1,250° C. or less;
    a first regenerative burner as a heat source for the moving hearth reducing furnace, disposed in the first half stage of a reducing process or a region between the feeding section and the gas discharge section and in the region in which the surface temperature of the agglomerate is 1,250° C. or less; and
    a second regenerative burner as a heat source for the moving hearth reducing furnace, the second regenerative burner being disposed horizontally or slightly upwardly with respect to the hearth of the moving hearth reducing furnace, in the second half stage of a reducing process or a region between the gas discharge section and the metal discharge section so that a combustion gas is an oxidizing atmosphere and the raw material is surrounded by a reducing atmosphere.

12. A method for producing a reduced metal by heating an raw material comprising a metal oxide component and a carbonaceous reducing component, the method comprising the steps of:
    feeding the raw material into the moving hearth reducing furnace; and
    heating the raw material by a regenerative burner disposed at the upper portion of the moving hearth reducing furnace while discharging waste gas from the furnace in the first half stage of a reducing process between feeding of the raw material and discharging of reduced iron.

13. A method for producing a reduced metal according to claim 12, wherein the raw material is heated by a regenerative burner which is disposed horizontally or slightly upwardly with respect to the hearth of the moving hearth reducing furnace at a upper portion of the moving hearth reducing furnace in the second half stage of the reducing process, and a combustion gas of the regenerative burner is maintained at an oxidizing atmosphere so that the vicinity of the regenerative burner is maintained at an oxidizing atmosphere and the vicinity of the raw material is maintained at a reducing atmosphere.

14. A method for producing a reduced metal according to claim 12, wherein the raw material is heated by a regenerative burner which is disposed in a region in which the surface temperature of the raw material is 1,250° C. or less in the first half stage of the reducing process, and the waste gas in the furnace is discharged at a position downstream of the region in which the surface temperature of the raw material is 1,250° C. or less.

15. A method for producing a reduced metal according to claim 12, wherein a first regenerative burner for burning a fuel with an oxidizing gas and a second regenerative burner for burning a combustible gas in the moving hearth reducing furnace with an oxidizing gas are disposed in the first half stage of the reducing process instead of the regenerative burner, and the second regenerative burner is disposed below the first regenerative burner.

16. A method for producing a reduced iron according to claim 12, wherein the regenerative burner burns a combustible gas in the moving hearth reducing furnace with an oxidizing gas, a burner for burning a fuel with an oxidizing gas is disposed in the first half stage of the reducing process, and the regenerative burner is disposed below the burner.

17. A method for producing an reduced metal according to claim 12, wherein the regenerative burner contains a regenerator comprising one of reduced iron and iron ore agglomerate.

18. A method for producing a reduced metal according to claim 12, wherein the metal oxide component of the agglomerate is an iron oxide component for producing reduced iron.

19. A method for producing a reduced metal according to claim 12, wherein a part or the entity of the metal oxide component is a nonferrous metal oxide for producing a reduced nonferrous metal.

20. An apparatus for producing reduced iron comprising
    a moving hearth reducing furnace for heating an raw material comprising an iron oxide component and a carbonaceous reducing component to form the reduced iron;
    the moving hearth reducing furnace comprising:
        a feeding section for feeding the raw material;
        an iron discharge section for discharging the reduced iron;
        a gas discharge section for discharging waste gas in the furnace, the gas discharge section being disposed in a reducing process between the feeding section and the iron discharge section; and a regenerative burner for heating the moving hearth reducing furnace.

21. A method for producing reduced iron comprising feeding and heating an raw material comprising an iron oxide component and a carbonaceous reducing component into a moving hearth reducing furnace, wherein waste gas in the furnace is discharged in the first half stage of a reducing process between feeding of the raw material and discharging of the reduced iron;

the raw material is heated by a regenerative burner horizontally or slightly upwardly with respect to the hearth of the moving hearth reducing furnace at a upper portion of the moving hearth reducing furnace;

the combustion gas of the regenerative burner is maintained at an oxidizing atmosphere so that the atmosphere in the vicinity of the regenerative burner is an oxidizing atmosphere; and the reducing gas generated from the raw material is burned while a reducing atmosphere to form the reduced iron surrounds the raw material.

* * * * *